Figure 1:
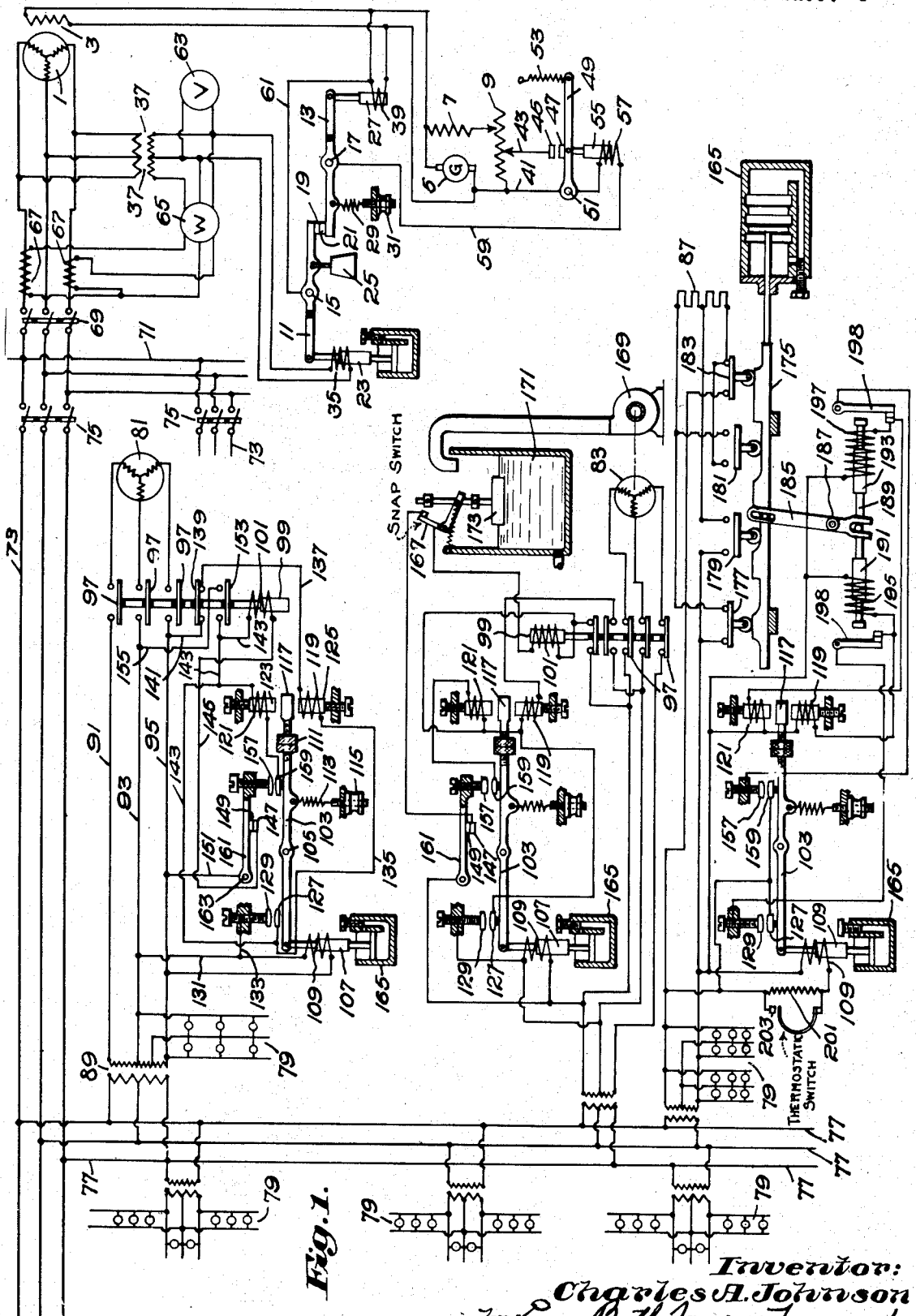

Jan. 2, 1934.  C. A. JOHNSON  1,941,863
ELECTRIC POWER DISTRIBUTING SYSTEM
Filed April 3, 1931  2 Sheets-Sheet 1

Inventor:
Charles A. Johnson
by Emery Booth Harvey & Townsend
Attys

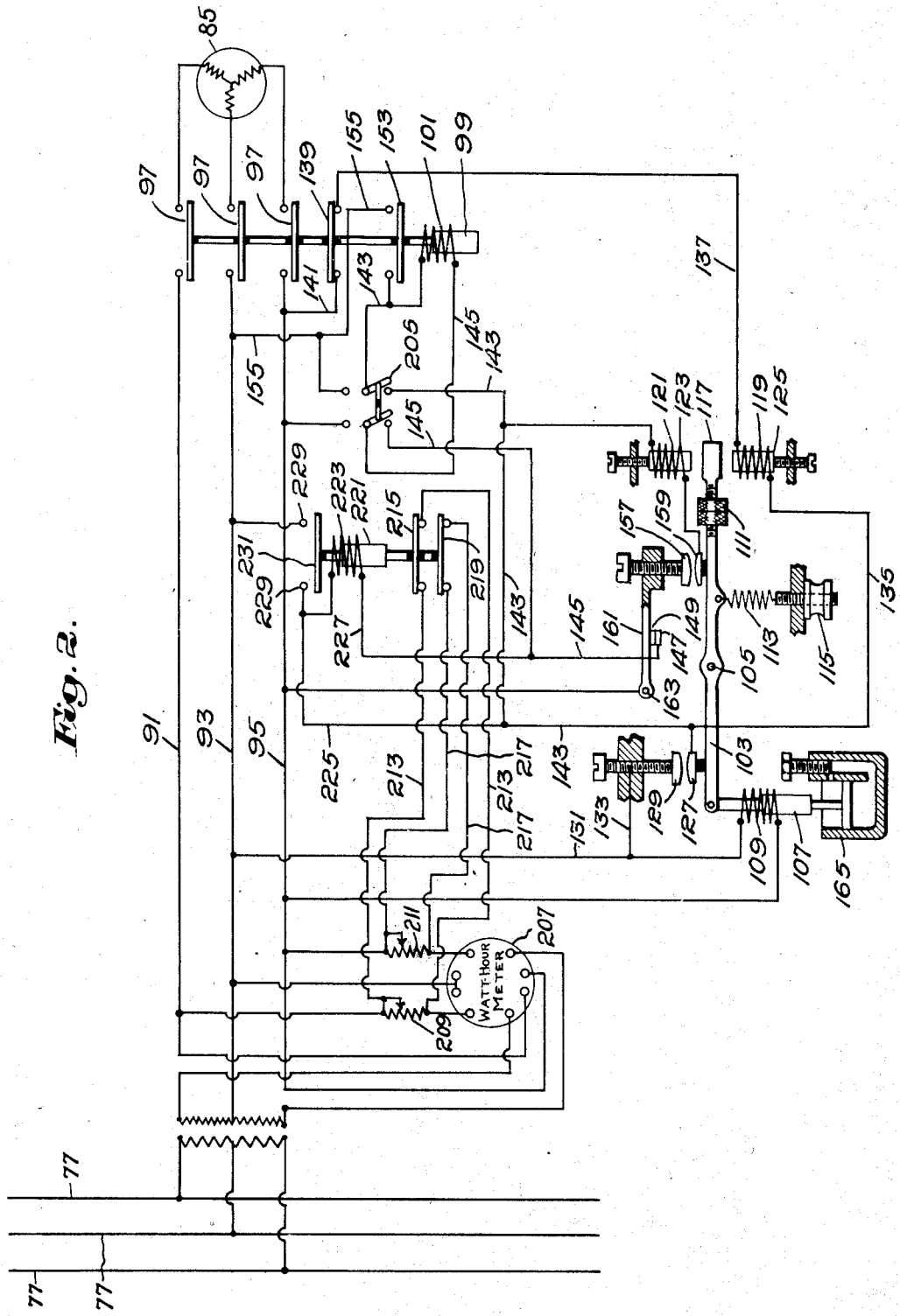

Patented Jan. 2, 1934

1,941,863

UNITED STATES PATENT OFFICE 1,941,863

ELECTRIC POWER DISTRIBUTING SYSTEM

Charles A. Johnson, Lexington, Mass.

Application April 3, 1931. Serial No. 527,598

6 Claims. (Cl. 171—97)

My invention relates to electric power distributing systems, and will be best understood from the following description when read in the light of the accompanying drawings, while the scope of the invention will be more particularly pointed out in the appended claims.

In the drawings:—

Fig. 1 is a schematic diagram of one form of power distributing system according to the invention; and Fig. 2 is a continuation of the diagram illustrated by Fig. 1.

Power systems, as for example those for distributing electricity to a large number of customers, commonly work at the so-called peak load but once in each twenty-four hours, and, the system being designed to handle this peak load, it follows that for the greater time the system represents capital investment which for the larger part is non-productive. Further, electric distributing systems commonly employ apparatus which works most efficiently under high load conditions, and therefore for the greater time this apparatus is worked at inefficient loads. Likewise such systems are subject to great fluctuations in load which cannot at all times be accurately forecast, with the result where the electricity is generated say from steam power the system is subject to economic losses because steam power plants are most efficient when operated at a steady load.

The net result of the above mentioned conditions is to increase the cost of the production of power, to the economic disadvantage of both the producer of power and the consumer. The present invention aims, among other things, to effect economic savings by enabling power distributing systems to be operated, so far as possible, under constant load conditions by enforcing selected loads to be operated under what are, or would otherwise be, low load conditions on the system, the selected loads to be thrown into and out of circuit automatically in response to load conditions or at the will of the power house operator, and further, among other things, aims to induce the customer to operate selected loads at low load conditions on the system.

The accompanying drawings, which schematically illustrate an embodiment of the present invention, show a generator 1 of the polyphase type, this generator situated at the power house and having the separately excited direct current field winding 3, the latter energized by a direct current generator 5 which has the field winding 7. As shown, the field winding 7 of the exciter generator is in series with a resistance 9 serving as a field rheostat for the generator, by means of which rheostat the exciter voltage may be controlled.

Preferably, the generator 1 for the system is provided with means for controlling the impressed voltage on the system, this means being automatically responsive to the voltage at the output of the generator and capable of manual adjustment for causing the generator to deliver current at selected predetermined constant voltages.

Referring to the drawings, the voltage regulator or controller for the power delivered to the system comprises a pair of levers or bars 11 and 13 respectively pivoted at 15 and 17, the lever 11 at one end carrying a contact 19 cooperating with a contact 21 at the adjacent end of the lever 13. As shown, the lever 11 is provided with a heavy armature 23 suspended from one end thereof, the weight of this armature being almost overbalanced by a counterweight 25 suspended from the lever at the opposite side of the pivot 15. Similarly, the lever 13 has suspended from one end thereof a heavy armature 27, while connected to the lever at the opposite side of the pivot 17 is a spring 29 or system of springs the tension of which may be controlled by a thumb screw 31 or the like. The parts are so designed that the counterweight 25 and the weight of the armature 27 normally tend to keep the contacts 19 and 21 in circuit closing relation.

As shown, associated with the armature 23 is a coil 35 electrically connected through a potential transformer 37 with the output terminals of the generator or with the bus-bars to which these output terminals are connected. Similarly, associated with the armature 27 is a coil 39 connected across the output leads of the exciter 5. As illustrated, part of the field resistance 9 of the exciter generator is adapted to be shunted by a circuit comprising the leads 41 and 43 and contacts 45 and 47. As shown, the contact 47 is carried by a bar 49 forming part of the shunt circuit, said bar being pivoted at one end at 51 and being urged upward to cause the contacts 45 and 47 to close by a spring 53, which latter is connected to the free end of the bar. Suspended from the bar at an intermediate portion of its length is shown an armature 55 with which is associated a coil 57 connected across the terminals of the exciter generator by a circuit comprising the lead 41, lead 59, bar 13, contacts 21 and 19, bar 11, and lead 61.

With constant generator speed and power factor it will be understood that the a. c. voltage impressed on the coil 35 will be constant. If the a. c. voltage drops, for example, due to an increase in load or change in power factor, the upward pull of the coil 35 on the armature 23 will be decreased and the armature 23 will descend and cause the contacts 19, 21 to open, which will break the circuit through the coil 57 and permit the spring 53 to close the contacts 45, 47 to shunt out a portion of the field resistance of the exciter generator, which will increase the exciter current and cause the a. c. voltage to rise. The rise in the exciter voltage will cause the coil 39 to pull the armature 27 down to cause the contact 21 to follow the contact 19 in the upward movement of the latter. When the rise in the a. c. voltage arrests the downward movement of the armature 23, the contacts 19, 21 will close, reestablishing the circuit through the coil 57 and thus opening the contacts 45, 47 to increase the field resistance of the exciter, which increase in resistance causes the a. c. voltage to tend to drop, the latter effect causing the contacts 19 and 21 again to open and the field resistance of the exciter generator to be decreased, with the total result that there occurs a rapid opening and closing of the contacts 19, 21 and 45, 47, causing the latter to act as a form of vibratory switch. It will be observed that the position of the armature 23 with relation to the coil 35 thus varies with the load, causing an increase in the effective exciter current with an increase in load, so as to maintain the a. c. voltage delivered to the system substantially constant as the load varies.
With the voltage controller above described the angular position of the bar 13 for a given exciter voltage is determined by the tension of the spring 29, and by varying this tension manually by means of the thumb nut 31, the a. c. voltage maintained constant by the regulator may be varied to secure preselected voltages, the latter indicated, for example, by the voltmeter 63. In the drawings is shown a wattmeter 65 for indicating the load on the system, and, for a purpose hereinafter described, the operator, by observation of the wattmeter, may vary the voltage impressed on the system under predetermined load conditions. As shown, the potential connections to the wattmeter are made through the potential transformers 37, and the current connections through the current transformers 67.

As indicated in the drawings, the generator 1 or a plurality of said generators may be connected through suitable switches 69 to bus-bars 71 or the like, to which latter various feeder lines 73 may be connected by suitable switches 75.

As shown the branch feeder line 77, which with the feeder 73 herein exemplifies the distributing system, is arranged to supply through suitable transformers the loads 79 conventionally indicated as illuminating circuits, these loads representing those supplied by the system in the usual manner without regard to the aggregate load on the system. This branch line is also indicated as supplying power for loads 81, 83, 85 conventionally illustrated as motors and the load 87 conventionally illustrated as a heating resistance. The loads 81, 83, 85, 87 for purposes of the present description may conveniently be considered as parts of the installations for different customers, and as constituting examples of loads to be controlled according to the present invention.

The arrangement for controlling the load 81 (Fig. 1) is designed to throw said load into circuit under high voltage conditions at the customer's station, which conditions correspond to low load conditions on the system. As shown, the secondary of the transformer 89 supplying power to the customer has connected thereto the three leads 91, 93, 95 for supplying the motor 81, electrical continuity of said leads being established or interrupted by a magnetically controlled switch having the three blades 97 and the actuating armature 99 and associated coil 101.

Herein, the application of actuating potential to the terminals of the coil 101 is controlled by a voltage responsive device which comprises a bar 103 pivoted at 105. To one end of the bar is suspended a heavy armature 107 associated with a coil 109 bridged across the leads 93, 95. At the opposite side of the pivot 105 from the armature 107 is an adjustable counterweight 111, which latter in conjunction with the spring 113 normally maintains the bar 103 in approximately a horizontal position. Conveniently, means may be provided for varying the tension of the spring herein exemplified by a thumb nut 115. At the opposite end of the bar from the armature 107 is an armature 117 with which are associated electro-magnets having the coils 119, 121 and the adjustable cores 123, 125.

Upon a rise in voltage across the leads 91, 93, 95 incident, for example, to decreasing load conditions, the increased voltage impressed on the coil 109 will draw the armature 107 upward, or, looking at it another way, will act in effect to decrease the weight of the armature to permit the spring 113 to draw the armature upward. By designing the spring so that its decrease in tension as it contracts occurs at a suitable rate with relation to the pull of the coil 109 on the armature 107 as the voltage rises, the armature 107 will assume different positions for each voltage within a limited range. When the voltage has risen to a desired value the contact 127 carried by the bar 103 comes against the contact 129, which latter is adjustable vertically so that the contact 127 touches it at the desired voltage. When the contacts 127, 129 close, a circuit is established from the lead 93 to the lead 95 through the coil 119 by way of the conductors 131, 133, contacts 129, 127, conductor 135, coil 119, conductor 137, switch blade 139, and conductor 141, and under these conditions the energized core 125 attracts the armature 117 so that the coil 119 acts as a holding coil to maintain the contacts 127, 129 closed. At the same time a circuit is established through the coil 101 to draw up the armature 99 and close the switch to throw the load into circuit, the coil 101 for this purpose being placed in parallel with the coil 119 by the conductor 143 and by the conductor 145, contacts 147 and 149, and conductor 151. Upon closure of the main switch, an auxiliary holding circuit is set up through the coil 101 by the switch blade 153, the left hand cooperating contact of which is connected to the lead 143, and the right hand cooperating contact of which is connected by the conductor 155 to the lead 93.

It will be observed that when the load 81 is thrown into circuit the voltage impressed on the load will decrease, and, if this decrease is sufficient to cause reopening of the contacts 127, 129, the holding circuit established by the switch blade 153 will maintain the main switch closed, unless the voltage drops to such value, incident to throwing other loads into circuit, that it is desired to have the main switch reopen. Assuming the load 81 is in circuit, and the voltage drops to a predetermined value, the armature 107 will drop sufficiently to cause closure of the contacts 157, 159, the latter of which is carried by the bar 103, and the former of which is carried by bar 161 in adjustable relation thereto, said bar 161 being pivoted at 163. Upon closure of the contacts 157, 159 a circuit is established through the coil 121 by way of the conductor 155, switch blade 153 (which latter is then against its associated contacts), conductor 143, coil 121, contacts 159, 157, bar 161, and conductor 151. This establishment of a circuit through the coil 121 causes the energized core 123 to pull the armature 117 with sufficient force to raise the bar 161 and open the contacts 147, 149, which interrupts the circuit through the coil 101 and permits the main switch to open.

Preferably the switch blades 139 and 153 are of the spring type so that they remain in contact with their associated contacts during the transition periods of the switch blades 97, and in this way prevent too sudden breaking of the circuits controlled by them relative to the operation of the other moving parts of the voltage responsive device and magnetic main switch.

It will be observed that the armature 107 assumes different positions for different voltages impressed on the coil 109, and that by suitably adjusting the contacts 129 and 157 with relation to their associated contacts 127 and 159, the range of voltage at the upper extreme of which the load 81 is thrown into circuit and at the lower extreme of which said load is thrown out of circuit may be varied. The rate at which the armature 107 moves to close the contacts may be regulated by the adjustable dash-pot 165 operatively connected to the armature, this dash-pot also preventing the armature from being affected by momentary changes in voltage impressed on the coil 109. As an example of the adjustment of the device, but without limitation thereto, the load 81 may be thrown into circuit when the voltage rises to 118 volts and be thrown out of circuit when the voltage falls to 114 volts. It will be observed, however, that as soon as the load 81 is thrown into circuit the voltage impressed on the load drops, in which case this drop, if the load is to be maintained in circuit, should not be greater than the range between the upper and lower limits at which the voltage responsive device is set to operate. Where a number of customers each has a load 81 controlled as described, the several dash-pots 165 may be set to cause different times of operation of the several voltage responsive devices, in which case only a fraction of said loads will be thrown into circuit if throwing in the total number of loads would cause a drop in voltage below that at which the voltage responsive devices are set to throw the loads out of circuit. In this way by setting the dash-pots 165 to operate at different times, or by setting the voltage responsive devices to operate at different voltages, different customers may be given preference over others, the customers given the greatest preference presumably paying for the power at a higher rate, or their necessity for power being more important than that of other customers.

It will also be observed that certain conditions may arise in which, independently of the load on the system, the operator at the power house may find it desirable to throw all or part of the different loads 81 into or out of circuit, say, for example, when some emergency condition exists. It will be obvious that if the different voltage responsive devices are set to respond at different voltages the operator may select a voltage at which all or part or none of the loads will be thrown into circuit under any given load condition. The operator by observing the wattmeter 80 at the power house may thus adjust the load on the system at will. Further, for example, the operator at the power house may raise the voltage to a value which will throw into operation the loads at several customers' stations operating at the same predetermined voltage, but upon closure of the customers' switches having the same dash-pot setting the voltage will be automatically lowered to prevent the operation of the switches having slower actuated dash-pots, and in this way also the operator can throw into operation less than the whole number of switches set to operate at a given voltage.

The control device shown for placing the load 83 in and out of circuit is exactly like the control device for the load 81, except for the float control snap switch 167 in the energizing circuit for the coil 101. In this arrangement, the motor 83 representing the load drives a pump 169 supplying water to a tank 171. Upon the tank being filled to a predetermined level the float 173 opens the snap switch 167, and when falling to a predetermined level closes said switch. It will thus be observed that when the tank is full, in which case the pump should not be operated, the main switch for throwing the load into circuit will remain open, notwithstanding the operation of the voltage responsive device. This arrangement represents the character of service furnished in many rural communities, and may be given preference, or not, over the load 81 as, for example, by suitable adjustment of the voltage responsive device as above described.

The circuit for operating the thermal device represented by the heating coil 87, as shown, comprises a reciprocatory cam bar 175 for closing the switches 177, 179, 181, 183 in selected arrangement so as to secure different currents through said coil as, for example, when the bar is in its extreme left hand position all the switches are open completely to deenergize the coil, and when moved to the right, first the switches 177 and 179 are closed to secure a minimum amperage, further movement of the bar to the right closing next the switches 179 and 181 to secure an increased amperage, while still further movement of the bar to the right closes the switches 179, 181 and 183 to secure the maximum amperage.

As shown, the bar 175 is reciprocated by a lever 185 which is pivoted at 187 and is connected at its lower end to a bar 189, the latter carrying at opposite ends respectively the armatures 191 and 193. The voltage responsive device is similar to that heretofore described, except that the contacts 147 and 149 and associated parts are omitted. In operation, when the voltage impressed on the coil 109 rises to raise the armature 107 the bar 103 is tilted to close the contacts 127, 129, which establishes a current through the holding coil 119 and through the coil 195 associated with the left hand armature 191 so as to cause the bar 175 to be shifted to the right. A decrease in the voltage impressed on the coil 109 will cause the bar 103 to be tilted to close the contacts 157, 159 and break the contact at 127, 129, in consequence of which the circuit through the coils 119 and 195 will be interrupted and a circuit will be established through the holding coil 121 and coil 197, the last mentioned coil being associated with the right hand armature 193 and being effective to shift the bar 175 to the left. As shown, associated with the coils 195 and 197 are limit switches 198 which are opened by the adjacent armatures 191, 193 when the latter are at the limit of their travel toward their associated coils to prevent the latter being energized under such conditions.

It will be observed that when the coil 195 is energized to effect circuit connections to the heating coil 87, the increased load will cause a fall in the voltage impressed on the coil 109, and that that fall in voltage immediately tends to move the bar 103 in such direction as to cause the coil 197 to be energized for changing the circuit connections to the heating coil to cause a decreased current flow through the latter, a decreased current flow causing a rise in the voltage impressed on the coil 109. As a result of this, a condition of equilibrium in respect to voltage is established, in which the load on the heating coil is coordinated to the voltage impressed on said coil to establish a load at which the resulting voltage is between predetermined upper and lower limits. As shown, the coil 109 has in series with it a resistance 201 controlled by a thermostatic switch 203 heated by the medium to which the resistance coil 87 imparts heat. On low temperatures the switch 203 is closed to shunt the resistance 201, but upon the temperature rising the switch opens to throw the resistance into circuit, which has the same effect on the coil 109 as lowering the voltage on the line.

In cases where it is desired to permit the customer to place the load in circuit independently of voltage or load conditions of the system, the arrangement shown by Fig. 2 may be employed. In this arrangement the load is placed in circuit by a main switch similar to that hereinbefore described, said switch having the blades 97 for establishing and interrupting the continuity of the leads 91, 93, 95 and having the coil 101 and armature 99 for causing opening and closing of the switch. As shown, the terminals of the coil 101 are connected to the blades of a two-pole, double-throw, manually operated switch 205. By throwing the switch to its upper position the coil 101 will be permanently connected across the leads 93 and 95 to maintain the main switch closed. When the switch blades are thrown to their lower position the coil 101 has its upper terminal connected to the contact 127 of the voltage responsive device and its lower terminal connected to the contact 147, and in this position of the switch 205 the voltage responsive device will operate exactly as hereinbefore described in connection with controlling the circuit connections for the load 81.

For inducing the customer to maintain the switch 205 in its lowermost position so that the main switch may be controlled automatically in response to the voltage in the feeder system, the watt-hour meter 207 for recording power consumed by the motor 85 is shown as having the resistances 209 and 211 in its potential leads, these resistances being normally shunted by low resistance circuits comprising the conductors 213 controlled by the switch blade 215 and conductors 217 controlled by the switch blade 219, the two switch blades being part of a magnetic switch having the armature 221 and associated coil 223. It will be observed that when the switch is closed the meter will operate at a normal rate, but that when the switch is open the resistances 209 and 211 will be effective to cut down the voltage impressed on the potential windings of the meter and thus cause the latter to run slower than at normal rate. By causing the switch to open when the main switch is under the control of the voltage responsive device, the customer is assured of power at a low rate, and thus the customer is induced to keep the main switch under the control of the voltage responsive device. Herein, the coil 223 is connected by the leads 225 and 227 in parallel with the coil 101, and therefore when the latter is energized to close the main switch the coil 123 is energized to open the shunt circuits around the resistances 209 and 211. As shown, the coil 223 is provided with a holding circuit exemplified by the contacts 229 and switch blade 231 for maintaining the coil energized until such time as the contacts 147, 149 separate to de-energize the coil 101.

It will be understood that the feature of causing the watt-hour meter to register at slower than normal rate, when the voltage responsive device is employed to actuate the main switch, may be utilized in the absence of the manually controlled switch 205, in which case the customer may be induced to permit installation of the voltage controlled load by giving him all or part of the power consumed (including, for example, that represented by the illuminating circuit 79 associated with the load 81) at a slower rate when the automatically controlled load is energized.

It will be understood that wide deviations may be made from the embodiments of the invention herein described without departing from the spirit of the invention.

I claim:

1. An electric power distributing system having, in combination, a plurality of loads to be energized by said system, and voltage responsive switch means acting to connect said loads into circuit when the voltages at the several points where said loads are to be connected are at the same predetermined value, said several switch means requiring different intervals of time for their operation in circuit closing direction.

2. An electrical distributing system having, in combination, means for supplying said system with energy at constant predetermined voltage adjustable at the will of the operator, a plurality of loads to be energized by said system, switch means responsive to like predetermined upper and lower voltage values at the several points in said system where said loads are to be energized acting to connect said loads into circuit at said upper voltage value and to interrupt such connection at said lower voltage value, said several switch means requiring different intervals of time for their operation in circuit closing direction.

3. An electrical power distributing system having, in combination, a load to be energized by said system, a power consumption meter for recording the power consumed by said load, means responsive to the voltage at the point in said system where said load is to be energized for connecting said load into circuit under high voltage conditions and simultaneously causing said meter to record at a reduced rate, and for interrupting such connection and placing said meter in condition to record at a higher rate under lower voltage conditions.

4. An electrical power distributing system having, in combination, a load to be energized by said system, a watt-hour meter for recording the power consumed by said load, the potential leads of said meter having associated switch controlled resistance means operative to cause said meter to record at high and low rates, switch means responsive to voltage conditions at the point in said system where said load is to be energized for connecting said load into circuit under high voltage conditions and for simultaneously operating said switch controlled resistance means to cause said meter to record at a low rate, and manually operated means for causing said load to be connected into circuit independently of said voltage condition at said point.

5. An electrical power distributing system having, in combination, a load to be energized by said system, a watt-hour meter for recording the power consumed by said load, the potential leads of said meter having associated switch controlled resistance means operative to cause said meter to record at high and low rates, switch means responsive to voltage conditions at the point in said system where said load is to be energized for connecting said load into circuit under high voltage conditions and for simultaneously operating said switch controlled resistance means to cause said meter to record at a low rate, said switch means also operative to interrupt such connection of said load into circuit under low voltage condition and simultaneously to operate said switch controlled resistance means to place said meter in condition to record at a high rate, and manually operated means for connecting said load into circuit independently of said voltage conditions.

6. An electric distributing system having, in combination, variable power consuming means to be energized by said system, a plurality of switch means for regulating the amount of power supplied said power consuming means, and means responsive to the voltage of said system at the point therein from which said power consuming device is to be energized for selectively operating said switch means for varying the power supplied said power consuming means with the variation in said voltage for maintaining the latter above a predetermined value.

CHARLES A. JOHNSON.